United States Patent [19]

Geraci

[11] 4,089,229

[45] May 16, 1978

[54] ROTARY TORQUE ACTUATOR

[76] Inventor: James Leonard Geraci, 9759 Acton Ct., Cincinnati, Ohio 45241

[21] Appl. No.: 710,717

[22] Filed: Aug. 2, 1976

[51] Int. Cl.[2] .............................................. F16H 25/12

[52] U.S. Cl. ........................................................ 74/57

[58] Field of Search ............ 74/57, 58, 59.15, 424.8 R

[56] References Cited

U.S. PATENT DOCUMENTS 1,876,506 9/1932 Lee ........................................... 74/57

2,274,821 3/1942 Bloxsom ................................. 74/57

3,916,701 11/1975 Butler ...................................... 74/57

*Primary Examiner*—Benjamin W. Wyche

*Assistant Examiner*—Wesley S. Ratliff, Jr.

*Attorney, Agent, or Firm*—J. Warren Kinney, Jr.

[57] ABSTRACT

A power section and a converter section are disposed in end-to-end, tandem relationship. Linear motion imparted by the power section to a captive nut in the converter section propells the nut along the spiral flutes of a drive shaft rotatably journalled in the converter section, thereby converting the linear motion of the nut to rotary motion of the drive shaft.

23 Claims, 14 Drawing Figures

ROTARY TORQUE ACTUATOR

BACKGROUND OF THE INVENTION

1. Field of the Invention

The field of this invention relates to rotary torque actuators, and more specifically to an actuator wherein a rotary driving torque is produced by means of a linear force applied to the rotary member.

At the present time, rotary torque is developed by various devices such as, by way of example, vane-type actuators wherein rotary motion is imparted to a drive shaft as the result of a fluid media under pressure acting upon the surface of a vane configuration mounted to the drive shaft. Another type of mechanism utilizes a scotch yoke, wherein linear motion is transmitted to a bell crank member which, in turn, is attached to a rotably shaft.

Gear drive mechanisms are also used for converting linear force through a rack attached to a pinion on a drive shaft which converts the linear motion of the rack to rotary motion.

2. Description of the Prior Art

Applicant is aware of the following U.S. Patents, each of which relate to and disclose means for imparting rotary motion to a rotable drive shaft by the application of a linear motion to a mechanism which engages and is moved along and relative to, the shaft:

The K. H. Meyer U.S. Pat. No. 3,255,806 dated June 14, 1966 discloses a one-way fluid actuated hinge structure which comprises and elongate, one piece tubular housing 20 having end caps 30 and 31 through which the opposite ends of an elongate shaft 44 project. Piston 53 of a piston-assembly which includes a tubular skirt 60 and a tubular ball nut 58 is adapted to move within housing 20 axially along the spirally grooved portion 52 of the shaft 44 for imparting a turning torque thereto. In FIG. 4 a pair of pistons are disposed within the elongate housing for movement in opposite directions along shaft 80. The power and rotary functions are combined within one elongate housing, whereas applicant utilizes separate power and converter sections which are disposed in end-to-end tandem relationship. Meyer's elongate housing 20 comprises a pressurized vessel, whereas in applicants device the converter section comprises an unpressurized vessel containing lubricating fluid. No fluid pressure stresses are incurred, and, as such the design of the converter section is directed to its mechanical load carrying characteristics without regard for radial stresses induced by fluid operating pressures.

The W. F. Mitchell U.S. Pat. No. 3,153,986, dated Oct. 27, 1964 discloses a rotary torque actuator which comprises an elongate, one piece tubular housing 10 having end members 11 and 12. A piston 20 and a cam member 21 are housed within the cylinder. Shaft 34 and its associated rollers 51 are housed within the cylinder for rotation relative thereto. The cylinder is also provided with cam rollers 41 which engage the fluted cam tracks 71 of the cam member 21. As the piston and cam member 21 are advanced to the right incident to the introduction of passure media into the cylinder via port 29 the cam member is advanced, in telescoping relationship over an end of shaft 34. The introduction of fluid media into port 32 at the opposite end of housing 10 will shift the piston to its initial, fully retracted position. The reference, like Meyer, supra, combines the power and rotary functions of the actuator in one elongate housing which comprises a pressurized vessel. Furthermore, the rod assembly of Mitchell is complicated whereas applicants drive shaft is solid having elongate spiral grooves machined and ground into its outer surface.

The H. M. Geyer U.S. Pat. No. 2,804,053, dated Aug. 27, 1957, discloses a device which includes a locking mechanism for a linear or rotary actuator. An elongate, cylindrical body 10 is provided with ends-11 and 12. Piston rod 16 projects through end 11, and the other end of the piston rod is counterbored to accept fluted shaft 25 which enters the counterbore threadably through a hollow nut 23. The other end of the fluted shaft is secured to and carried by a friction brake (FIG. 6) which is incorporated in mounting cap 12. The linear movement of the piston, piston-rod assembly imparts rotary motion to shaft 25 via hollow nut 23. The fluid pressure which actuates the piston is used to unlock the friction brake, and when fluid pressure is withdrawn the friction brake is actuated for, thus, locking the piston rod relative to cylindrical body 10. This reference, like that of Meyer, and Mitchell combines the power and rotary functions of the actuator in one elongate housing which constitutes pressurized vessel.

The H. M. Geyer U.S. Pat. No. 3,133,476, dated May 19, 1964, discloses a rotary actuator which comprises a single, elongate, tubular member 10 which defines a cylinder having end members 12 and 14. Shaft 26 extends throughout the length of the cylinder, said shaft being journaled at its ends for rotary motion, and provided with internal ports 70 and 74. The central portion of the shaft is enlarged to provide a bulkhead 28. Tandem pistons 48–56 are provided at opposite ends of skirt 52 the outer surface of which is provided with flutes 80 which engage and traverse the elongate inside helix 84 of end member 14, thus imparting rotary motion to shaft 26. This reference, like those heretofore discussed combines the power and rotary functions of the actuator in a single elongate housing, and the comparatively large diameter and length of the fluted members, together with the chamber defined by piston head 48, skirt 52, and piston 56 impose serious mechanical limitations on the potential force loading. The wall thickness of skirt 52 must be sufficiently thick to withstand the operating pressures, and skirt 86 must have sufficient strength to carry the rotary load to rotary member 14, together with sufficient fluid geometry to properly drive and mesh with skirt 52.

The J. E. Davis U.S. Pat. No. 3,090,244, dated May 21, 1963 discloses a rotary actuator which comprises a single cylinder defined by a single, elongate, tubular member 10 having end caps 12 and 14. A through shaft 18 having spline teeth 64 and 76 on opposite sides of a central bulkhead 86, extends through the end caps. A piston assembly 30 which includes a nut 42, annuli 46 and 48, tubular member 44, and various seals traverses the interior of member 10. The design of this reference is exceedingly complex utilizing a multiplicity of splined members and seals which occurs by reason of the integration of both the power and rotary conversion functions within the same housing number 10. The device is further complicated by the projection of drive splines 20 on both ends of the actuator being driven by the same mechanism.

The J. C. Miller U.S. Pat. No. 2,974,646, dated Mar. 14, 1961, discloses a rotary actuator which comprises a single cylinder defined by an elongate tube 10 having end caps 11 and 12. A through shaft 15 is provided with a splined portion 19 which is engaged by a complementary portion of piston 23 which rides upon rods 26 which prevent the piston from rotating. In this reference the piston 23 performs the dual function of a power piston and drive nut. The power piston must be sealed not only against the inside diameter of the cylinder tube, but also at two locations where rods 26 pass through it. Additionally, the fluted inside diameter of the piston must be sealed against the flutes of the shaft. In applicant's device all fluid pressure sealing is isolated and confined to the power section thereby providing a complete separation of the power piston function from the drive nut thereby affording the opportunity to design these components with regard to their intended function without compromise.

The D. R. Ligh U.S. Pat. No. 3,499,342, dated Mar. 10, 1970, discloses a multiple motion converting actuator which, as illustrated in FIG. 4, comprises a shaft 3 having opposite ends journaled for rotary movement relative to the ends 11′ and 14*a*′ of a first cylinder 14′. A piston 25 is reciprocably mounted in a second cylinder 12. Torque heads 6 and 7 are secured, respectively to outer piston segments 26 and inner piston 25 by means of tie rods 29 and 32 which project through the innermost end wall of cylinder 14′. The outer surface of torque heads 6 and 7 are provided with splines which engage corresponding guides in the cylinder wall for precluding rotation of the torque heads incident to their movement between advanced and retracted positions. Each of torque heads 6 and 7 is provided with a through bore having teeth which engage the elongated splines 5 in the outer surface of the drive shaft. Fluid pressure media is adapted to be introduced into the outer end of a cylinder 12 for advancing the pistons 25 and 26 toward the drive shaft, and fluid media is adapted to be introduced via port 37 and the cylinder 14′ for moving the pistons and their respective torque heads in the opposite direction relative to the drive shaft.

The R. O. Arvold U.S. Pat. No. 3,393,610, dated July 23, 1968, discloses a pressure-media operated torque actuator which comprises a power transfer part A and a converter section B which includes longitudinal splines 9, guides 10 and a nut-sleeve 11 which is secured to and carried by piston rod 14. An externally splined rod 3 passes through the inside diameter of piston 4, extends through piston rod 14 and threadably engages internal longitudal spline 9. Fluid media is introduced either through port 25 at the outer most end of portion A, or through port 24 at the outer most end of portion B, whereby the power and rotary functions are combined in what amounts to a single, elongate, two-step housing 7 & 8 which defines a single, pressurized vessel. The J. C. Miller U.S. Pat. No. 2,936,737, dated May 17, 1960 discloses a rotary actuator which comprises a single cylinder 10 having end caps 11. A rotable through shaft 18 is splined at 25 for engagement with complementary portions of piston 15, which is prevented from turning by means of elongate rods 13 which span the end caps and extend through openings in the piston.

SUMMARY OF INVENTION

The rotary torque actuator, of the present invention, comprises a power section and a converter section which are connected in end-to-end tandem relationship. The power section may comprise a conventional air or hydraulic cylinder, which is totally contained in itself, and as such embodies the design criteria generally associated with the specifications of the National Fluid Power Association's Joint Industrial Committee. The power section is adapted to be mounted by any one of the fifteen methods in conformance with the standards of the aforesaid Committee.

The mating of the power section with the converter section is accomplished through the hollow-ended piston-rod of the power section, which has been designed to accept a captive nut mounted for linear travel within the converter section. The drive shaft of the converter section projects into the hollow end of the piston rod upon advancement of the nut and piston rod along the fluted end of the drive shaft. The power cylinder, when actuated, causes the piston-rod to advance or retract whereby, the captive nut is guided, in a linear direction upon diametrically spaced guide rails mounted on the inside diameter of the cylinder wall of the converter section.

The drive shaft of the converter section is secured, adjacent its outer end, by a double row of tapered bearings which rotably mount the shaft relative to the converter section. The other end of the drive shaft is mated via spiral grooves to complementary teeth on the inside diameter of the captive nut.

As the power cylinder is actuated, the piston-rod is advanced from a retracted to an advanced position, causing the nut to move over and along the spiral grooves of the shaft thereby converting the linear force of the nut into rotary torque of the shaft.

The interior of the converter section is normally bathed in oil for maximum lubrication of the contents thereof.

By changing the geometry of the captive nut to the extent that its outside configuration basically conforms to the inside geometry of the cylinder of the converter section, the nut can be used as a booster for the power section to the extent that at the same time, hydraulic pressure is applied to one or the other of the sides of the piston of the power cylinder, a like pressure is simultaneously applied to a corresponding side of the captive nut, which then acts as a booster for the power output of the power section. It has been estimated that the overall power output of the power section can thus be increased by at least 50 percent. The amount of power thus applied by the nut functioning as an auxiliary piston is limited by reason of the leakage which occurs around the O D of the nut, and such leakage cannot be effectively sealed because of the geometry of the captive nut incorporated slots for cooperation with the guide rails of the converter section. For this reason, a corresponding boost advantage cannot be attained in those instances in which the power media is a gas.

The structural details of the device, and in particular the details of the converter section are such that it is a comparatively simple task to utilize different nuts and drive shafts for accomplishing different degrees of drive shaft rotation, by merely replacing the nut, which is securely, though releaseably, fastened to the forward end of the piston-rod and/or by associating a different drive shaft with the mounting means located in the forward end of the converter section.

From the foregoing, it will be noted that a manufacturer may stock an inventory of power sections, and an inventory of nuts and drive shafts, to be associated with the converter sections, wherein the relationship of the teeth of the nut and the slope of the spiral grooves of the drive shaft are literally "tailor-made" for each particular application.

DESCRIPTION OF THE PREFERRED EMBODIMENT

Figures 1, 2, 3, 4:
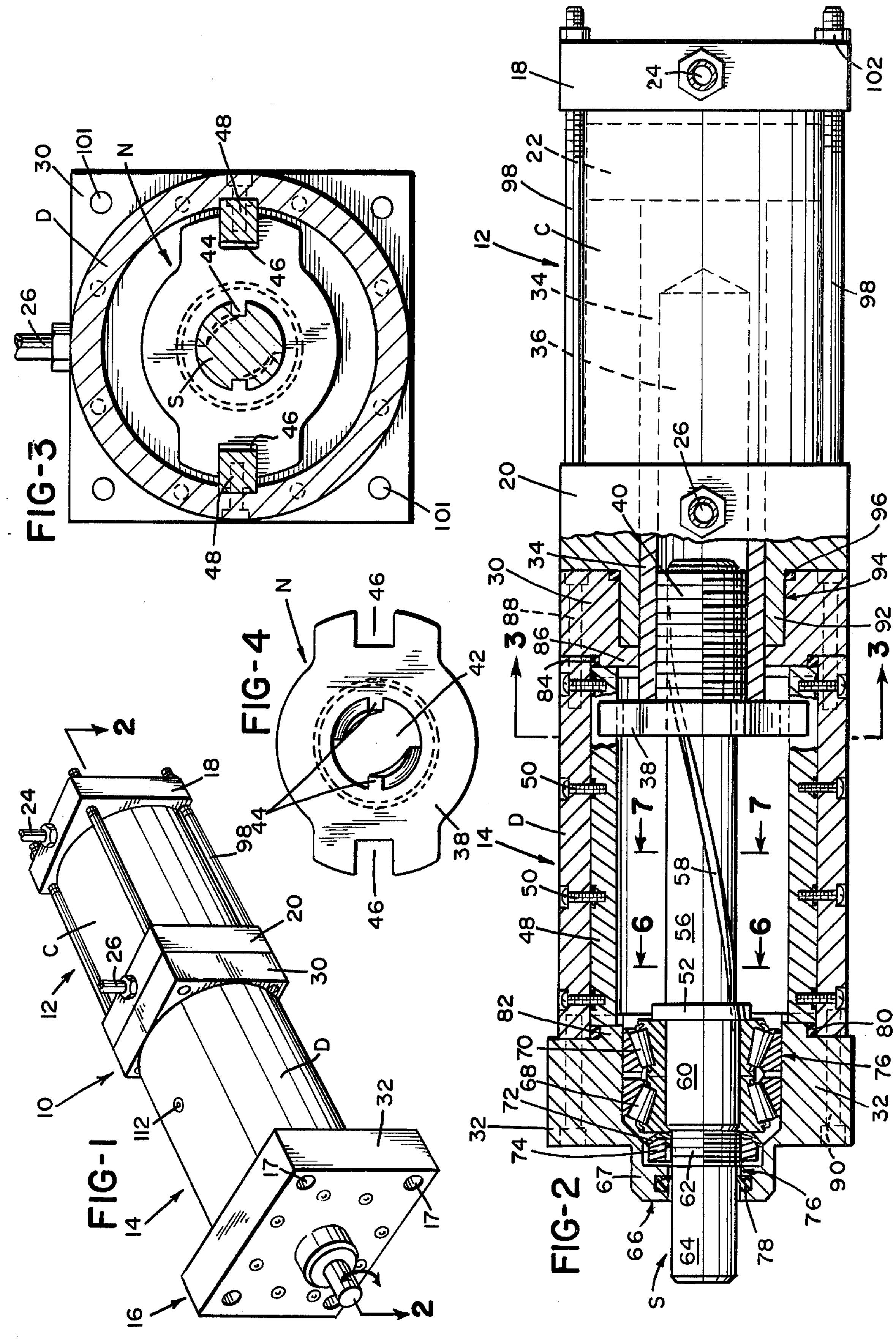
FIG. 1 is a perspective view of a rotary torque actuator which embodies the teachings of the invention.
FIG. 2 is a top view of the actuator of FIG. 1 with parts thereof broken away to disclose the structural details of the converter section thereof.
FIG. 3 is a view taken in line 3—3 of FIG. 2.
FIG. 4 is a front end view of an actuator nut which comprises a detail of the invention.

With particular reference to FIG. 1, the numeral 10 denotes, generally, a device embodying the teachings of the present invention, wherein the numeral 12 indicates the power section and wherein the numeral 14 designates the converter section of the device.

The forward or output end of the converter section 14 terminates in a mounting flange 16 having suitable openings, such as 17, therethrough for the reception of bolts or the like (not illustrated) by which unit 10 may be secured to a supporting surface, or member, for disposing the outer, projecting end of drive shaft S in desired relationship with respect to a device to be driven.

Power section 12, in the preferred embodiment, comprises a conventional cylinder C having a rear end plate 18, a forward end plate 20 and a piston 22 reciprocable between fully retracted and advanced positions incident to the introduction of fluid media, under pressure, into one or the other of ports 24 and 26, with the simultaneous exhaust of media via the other of said ports.

The converter section 14, in the preferred embodiment, comprises a cylinder D having a rear end plate 30 and a forward end plate 32, which in the preferred embodiment is common with the mounting flange 16.

Forward end plate 20 of the power section 12 and rear end plate 30 of the converter section 14 are provided with axial bores through which the forward end of the piston rod 34 projects even when the piston 22 is in the fully retracted position of FIG. 2.

The forward end of the piston rod is provided with an elongate, internal, axial bore 36 which is dimensioned to loosely and telescopically receive the rear end portion of shaft S incident to movement of the piston rod from a fully retracted to a fully advanced position.

A captive nut N is secured to and carried by the forward end of the piston rod, and, in the preferred embodiment of the invention the nut includes an enlarged forward portion 38 and a rearwardly projecting, externally threaded cylindrical portion 40. The nut is also provided with an internal bore 42 dimensioned to slideably receive the end of shaft S, and a tooth, or a pair of diametrically opposed teeth 44 are formed integral with the nut whereby to project inwardly of bore 42.

The externally threaded portion 40 of the nut is received within an internally threaded portion of the outer end of bore 36 of the piston rod whereby the nut will move in unison with piston 22.

Figure 12:
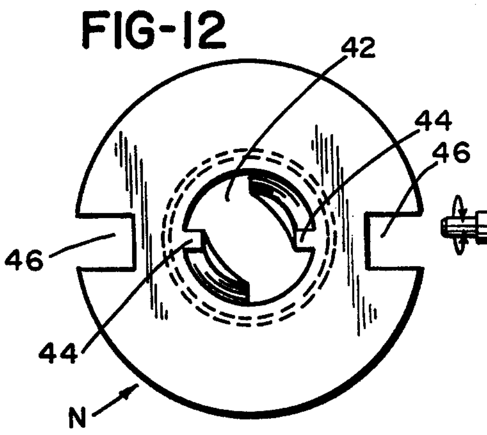
FIG. 12 is a front view of the actuator nut of FIGS. 10 and 11.

As best illustrated in FIGS. 4 and 12, a pair of diametrically opposed grooves 46 are provided in the opposite sides of the enlarged portion 38 of the nut, wherein said grooves are dimensioned to slideably engage a pair of complementary guide rails 48, see FIGS. 2-3, which are secured to opposite sides of the interior of cylinder D such as, by means of set screws 50. The guide rails 48 extend the full length of cylinder D between the end plates 30 and 32.

Figures 5, 6, 7, 8, 9:
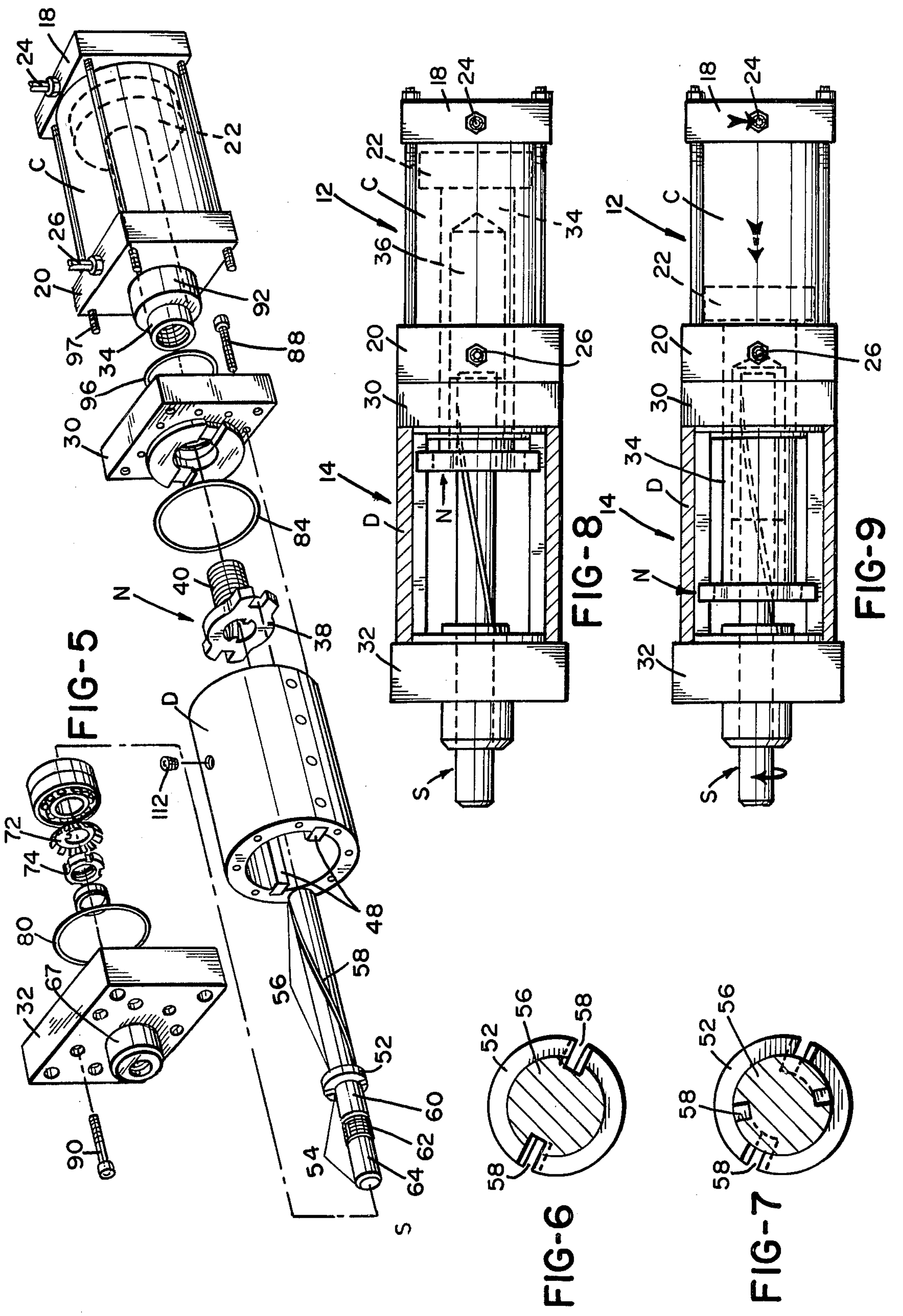
FIG. 5 is an exploded perspective view of the component parts of the actuator of FIG. 1.
FIG. 6 is a sectional view of the drive shaft taken on line 6—6 of FIG. 2.
FIG. 7 is a sectional view of the drive shaft taken on line 7—7 of FIG. 2.
FIGS. 8 and 9 are top views of the actuator of FIG. 1 with portions of the converter portion shown in section, disclosing the actuator nut in a fully retracted and in a fully advanced position, respectively.

With particular reference to FIGS. 2 and 5, the numeral 52 designates a circumferential shoulder the diameter of which is greater than the diameter of the forward end of portions 54 and the rearward end of portions 56 of shaft S. The rearward end of the shaft is provided with a pair of diametrically opposed, elongate spiral grooves 58 which are slideably engaged by the complementary teeth 44 of bore 42 of nut N, see FIG. 3.

The forward portion of the shaft is provided with a cylindrical rear portion 60 immediately adjacent, and forwardly of shoulder 52, an intermediate, externally threaded, cylindrical portion of a lesser diameter than rear portion 60, and a cylindrical outer end or terminal portion 64 which projects forwardly of and beyond front surface 66 of portion 67 of the front end wall 32 of the converter section.

Shaft S is secured to and rotably journaled in the converter section by means of front and rear thrust bearings 68 and 70, the inner races of each of which snugly engage shaft portion 60 between shoulder 52 and retainer 72 which is engaged by jam nut 74 which engages shaft threads 62. The outer races of bearings 68 and 70 are received within axial bore 76 of the front end plate 32 of cylinder D, as clearly illustrated in FIG. 2, whereby the shaft is fixed against endwise axial movement.

Suitable packing, indicated by the numeral 78 is provided between the forward cylindrical portion 64 of the shaft and a corresponding portion 67 of the front end wall 32, to preclude external leakage of lubricant within cylinder D along shaft S.

An O-ring seal 80 is provided between adjacent portions of rear shoulders 82 of the front end wall 32 and the inner surface of the forward end of cylinder D; and an O-ring seal 84 is provided between adjacent portions of front shoulder 86 of the rear end wall 20 of the converter section and the inner surface of the rearward end of cylinder D.

The front and rear end walls 32 and 30 are secured to opposite ends of cylinder D by means of cap screws 90 and 88 respectively.

The power section 12 and the converter section 14 are secured in end-to-end tandem relationship with the forwardly projecting portion 92 of the forward end plate 20 of cylinder C received within the complementary socket 94 of rear end plate 30 of cylinder D. Suitable sealing means, such as an O-ring 96 may be utilized to provide a fluid-tight connection between the adjacent end plates of cylinders C and D, as illustrated in FIG. 2.

Uniformly satisfactory results have been obtained in those instances in which the threaded ends 97 of tie rods 98 are threaded into holes 101 tapped into the rear end plate 30 of cylinder D, and wherein said tie rods extend through holes in the forward and rear end plates 20 and 18 respectively of cylinder C with the rear ends of said rods being engaged by nuts 102.

Servicing of the converter section may be accomplished by disengaging the tie rods from the rear end plate 30 of cylinder D, thereby permitting the entire power section 12 to be moved away from the converter section 14 by a distance equal to the overall travel of piston 22 in cylinder C from its fully retracted to its fully advanced position. This movement will separate end plates 30 and 20 and expose the heads of cap screws 88, which when removed permit removal of end plate 30 of cylinder D thereby exposing the end of the piston rod and nut N.

Access to the drive shaft S may be had by removing cap screws 90 to release front end plate 32 and its associated shaft S from cylinder D, in which event the rearward portion 56 of the shaft is disengaged from nut N.

It should be understood that the relationship between teeth 44 of nut N and the pitch of the spiral grooves 58 of the shaft S are such as to provide a predetermined number of degrees of rotation to the shaft as the nut is advanced along the shaft from its fully retracted to its fully advanced position.

The ready accessibility to nut N and shaft S, as aforesaid, permits the easy modification of the operating characteristics of an actuator to accommodate any particular operating condition within the stroke range of the piston.

Figure 10:
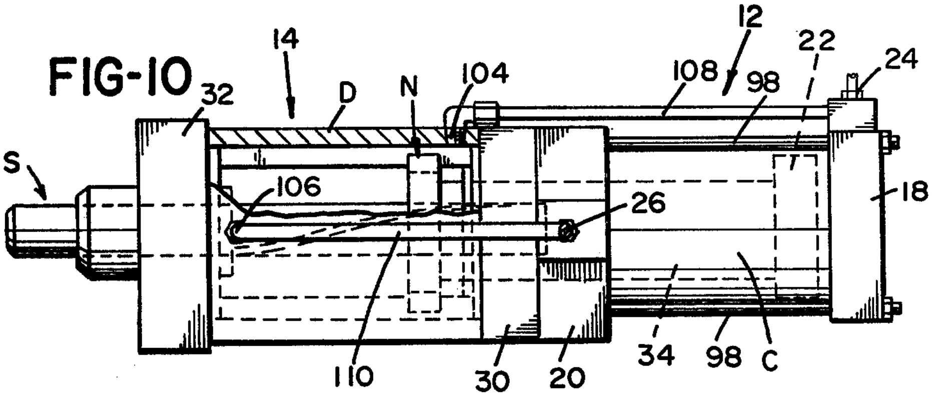
FIGS. 10 and 11 are views similar to FIGS. 8 and 9 illustrating the use of the actuator nut as an auxiliary piston.
Figure 11:
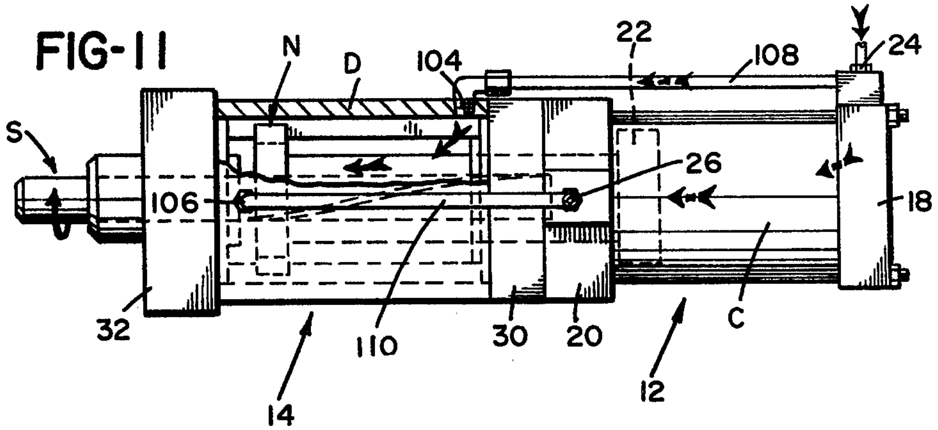

In those instances in which the power-output demand of shaft S is such as to substantially equal or exceed the power output of piston 22 of cylinder C of the power section 12, the driving torque applied to shaft S by nut N may be increased by as much as 50%, by changing the geometry of nut N from that of FIG. 4 to that of FIG. 12, wherein the outside configuration of the nut conforms substantially to the inside configuration of cylinder D, whereby the nut constitutes an auxiliary piston. In those instances in which nut N constitutes an auxiliary piston, ports 24 and 26 of cylinder C are disposed in open communication with ports 104 and 106 of cylinder D by means of conduits 108 and 110 whereby pressure media is simultaneously applied to the same side of piston 22 of cylinder C and nut N of cylinder D, as illustrated in FIG. 11, wherein the headed arrows indicate the application of pressure media to advance the nut, piston and piston rod from the fully retracted position of FIG. 10 to the fully advanced position of FIG. 11.

In those instances in which the nut within the converter section is utilized as an auxiliary piston, the interior of cylinder D will be subjected to whatever lubricating characteristics are inherent in the pressure media.

In those instances in which the interior of the cylinder of the converter section is fluid-isolated from the interior of the cylinder of the power section, as in FIGS. 1 and 2, a suitable lubricant is introduced into cylinder D via an opening which is closed by plug 112, FIGS. 1 and 5, for bathing the rearward portion of the shaft, guide rails and nut with lubricant.

Figure 13:
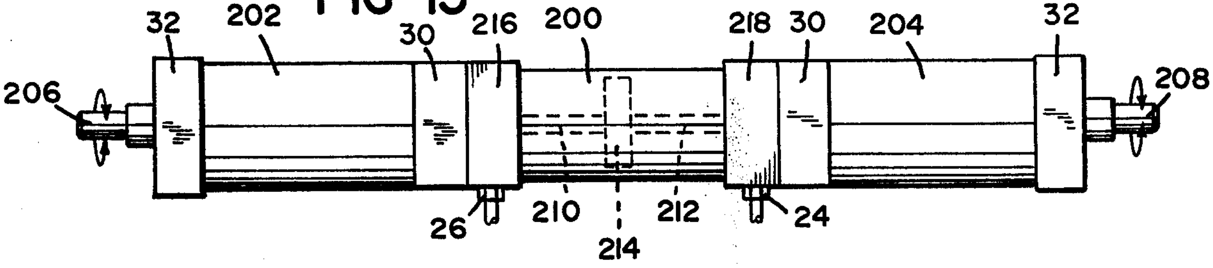
FIG. 13 is a side view of an actuator having a single, central power section, and a pair of converter sections disposed one in each end of the power section.

FIG. 13 illustrates an actuator which embodies the teachings of the present invention, but wherein a single, power section 200 is located in end-to-end relationship with and between a pair of converter sections 202 and 204 for providing a pair of laterally spaced, axially aligned rotatable drive shafts 206 and 208.

The power section 200 differs from that of power section 12 in that a pair of piston rods 210 and 212 project one each from an opposite side of piston 214, wherein piston rod 210 projects through end plate 216, whereas piston rod 212 projects through end plate 218, said end plates being similar to end plate 20 of the power section 14 of FIGS. 1, 2, and 5. The end plates 30 and 32 of converter sections 202 and 204 are similar to the same numbered name plates of converter section 14.

In FIG. 13 the relationship between the captive nuts and the spiral grooves of the shafts of the converter sections 202 and 204 are such as to cause shafts 206 and 208 to rotate in the same direction, however, they can be caused to rotate in opposite directions, if desired, by altering the relationship of the threads of the nuts and the corresponding spiral grooves of the shafts.

Figure 14:
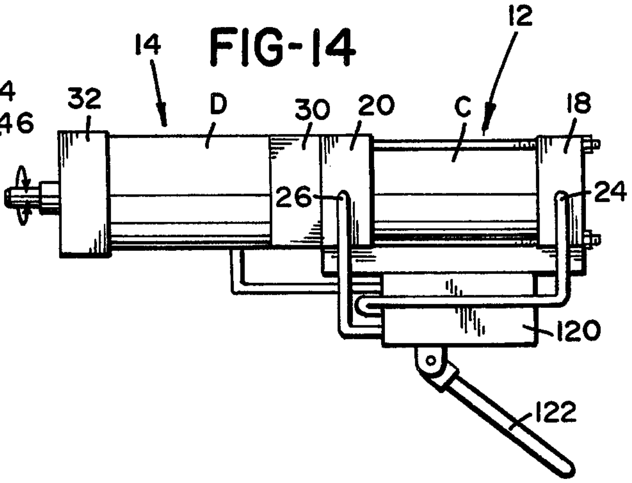
FIG. 14 is a side view of the actuator of FIG. 1 provided with a self-contained reversible, manually operable pump.

FIG. 14 illustrates an actuator of FIG. 1 which has been provided with a self-contained, manually operable pump 120 which may be actuated, via lever or handle 122 to selectively introduce fluid media, under pressure into ports 24 or 26 for shifting the piston of the power section 12 toward or from it fully advanced position.

From the foregoing it will be noted that I have provided simple, yet highly effective means for efficiently producing rotary motion from a linear force. The technology involved in the generation of the linear force conforms to sound principles of linear actuation which is characterized by leak-free operation. The overall simplicity of design affords long and dependable service life and provides for design and application flexibility.

All sealing surfaces are circular, thus the long service life experienced with fluid power cylinders is obtained. The end-to-end tandem, or in-line relationship between the power section 12 and the converter section 14 are such that no load limitations are placed on the drive shaft save those which accrue to the strength of materials.

The subject device is particularly well adapted for use in the fields of valve actuation, mechanical twisting load lifting, material handling, mixer dumps, marine applications such as by way of example, for opening and closing hatch covers, off-the-road equipment applications such as back hoes, shovels, lift forks, and various types of mobile material handling equipment.

Heretofore 2000 p.s.i. has, in most instances represented the maximum operating pressure to which the prior art devices have been subjected, however, pressures of 10,000 p.s.i. and more may be used to actuate the power section 12 of the subject device in those instances where a high rotary torque output is required.

The overall output requirement both in terms of rotational degrees and torque is controlled by adjusting either the length or the spiral of the grooves of the drive shaft. These can be tailored for specific applications. If the overall length of the unit is to be as short as practicable, the incline of the spiral grooves would be increased at a sacrifice of some efficiency which would necessitate a greater input force from the power section, to compensate for the loss in efficiency.

If overall efficiency of the unit is the prime consideration in view of a given input media to the power section, the unit can be lengthened to accommodate a shallower or lesser degree of incline of the spiral grooves of the drive shaft.

In those instances in which a single power section is utilized in conjunction with a pair of converter sections, such as, by way of example, is illustrated in FIG. 13, it is not only possible, but highly practical to provide a device in which shafts 206 and 208 rotate in the same direction, and by the same amount; or in which shafts 206 and 208 are rotated in the same direction but through a different number of degrees of rotation, incident to movement of piston 214 of the power section.

Shafts 206 and 208 may also be rotated in opposite directions through the same number of degrees and/or they may be rotated in opposite directions but through a different number of degrees of rotation incident to movement of piston 214 of the power section.

It should be understood that the direction of rotation of shafts 206 and 208, and the degrees of rotation imparted to said shafts is a function of the characteristics of the spiral grooves of the drive shafts, the teeth of the nuts which engage the spiral grooves of the shafts, and the length of travel of the piston.

The manner in which the drive shafts are releasably associated with their respective end walls, and the manner in which the nuts are releasably associated with the piston rods of the power section permits the operating characteristics of an actuator to be tailor made and/or changed, at any time to meet, changing conditions.

What is claimed is:

1. A rotary torque actuator comprising:

a unitary, self-contained power section which includes a piston rod and means responsive to fluid media under pressure for imparting linear motion to said piston rod, said piston rod having an axial bore defined therein;

a captive nut connected to said piston rod, said captive nut including a hollow bore extending axially therethrough and received within said piston rod bore so that said nut bore is located within said piston rod bore, said captive nut further including guide teeth located inside said captive nut to project inwardly of said hollow bore, said piston rod imparting linear movement to said captive nut;

a unitary, self-contained converter section which includes a solid drive shaft rotatably mounted therein for rotary motion, said drive shaft having arcuate guide teeth receiving means defined on the outer surface thereof and being received within and extending through said captive nut hollow bore to extend into said piston rod axial bore, said captive nut guide teeth being received in said drive shaft guide teeth receiving means so that said captive nut linear motion is translated into drive shaft rotary motion as said guide teeth traverse said arcuate guide teeth receiving means; and connecting means interconnecting said power and converter sections in end-to-end, tandem relationship.

2. An actuator as called for in claim 1, wherein the length of the piston rod of the power section is such as to project into the converter section even when the piston of the power section is in a fully retracted position.

3. An actuator as called for in claim 1, wherein that end of the piston rod which projects into the converter section includes said axial bore.

4. An actuator as called for in claim 1, wherein the converter section includes guide means engageable by the nut to restrict its movement to straight-line, linear travel.

5. An actuator as called for in claim 4, wherein the outer periphery of the nut includes grooves which slideably engage and ride upon the guide means of the converter section.

6. An actuator as called for in claim 1, wherein the forward end of the drive shaft projects axially from the output end of the converter section, and wherein the output end of the converter section includes means for securely though releasably rotably journaling said drive shaft while precluding any endwise movement thereof.

7. An actuator as called for in claim 1, which includes means by which the nut is securely though releasably fastened to the piston rod.

8. A rotary torque actuator, comprising:

(a) a unitary, self-contained power section in which fluid media, under pressure, imparts linear motion to the piston, piston-rod assembly of a first cylinder, (b) a unitary, self-contained converter section in which the linear motion of the piston-rod of the first cylinder is imparted to a nut housed within a second cylinder in which a drive shaft is rotatably mounted, the drive shaft including a forward and a rearward end separated by a circumferential shoulder the diameter of which is greater than the diameter of either of said ends, (c) means engaging and interconnecting said nut and drive shaft whereby linear movement of the nut imparts rotary motion to the drive shaft, and, (d) means interconnecting said power and converter sections in end-to-end, tandem relationship.

9. An actuator as called for in claim 8, wherein the forward end of the drive shaft comprises a cylindrical portion adjacent to the circumferential shoulder dimensioned to receive the inner races of a pair of tapered bearings, an externally threaded intermediate portion dimensioned to receive a retainer nut, and an outer cylindrical terminal portion, and wherein the rearward end of the drive shaft includes a pair of diametrically opposed spiral grooves.

10. An actuator as called for in claim 9, wherein the pitch of the spiral grooves is a function of the length of linear travel of the nut and the predetermined number of degrees through which the shaft is turned as the nut is advanced from a fully retracted to a fully advanced position.

11. A rotary torque actuator comprising: a unitary, self-contained converter section in which a linear force is transformed into a rotary force, said section including a cylinder having front and rear end walls having an axial bore therethrough; a solid drive shaft extending through the bore of the front end wall with forward and rearward portions of the shaft projecting from opposite sides of said end wall; means rotatably mounting said shaft to the front end wall against endwise axial movement therewith, with the rearward portion of the shaft projecting toward and extending through the bore of the rear end wall; a pair of diametrically disposed spiral grooves extending along the length of said rearward portion of the shaft; a nut having a drive-shaft receptive bore and a pair of diametrically disposed, radially inwardly projecting teeth engaging the spiral grooves of the drive shaft; elongate guide means within the cylinder extending between said front and rear end walls; complementary means on the nut in engagement with the elongate guide means for restricting movement of the nut within the cylinder to straight-line, linear travel; and means imparting linear motion to said nut, said last mentioned means including a unitary, self-contained power section which includes a cylinder having front and rear end walls the front one of which has an axial bore therethrough, a piston reciprocable within the cylinder between fully retracted and advanced positions, a piston rod having a forward end which includes an elongate, axial, open ended drive-shaft-receptive bore, wherein the length of the piston-rod is such that its forward end projects through the bore of the front end wall of the cylinder of the of the power section and through the bore of the rear wall of the cylinder of the converter section when said end walls are disposed in abutting relationship and with the piston in a fully retracted position adjacent the rear end wall of the cylinder of the power section; means securing the nut to the forward end of the piston rod with the rearward portion of the drive shaft extending through the bore of the nut and terminating within the bore of the piston rod; and means securely though releasably interconnecting the converter and power sections in end-to-end tandem relationship, whereby linear motion imparted to the nut via the piston rod of the power section is translated into rotary motion of the drive shaft incident to movement of the nut along the rearward spiral grooved portion of the shaft.

12. An actuator as called for in claim 11 wherein the drive shaft is securely, though releasably, mounted to the front end wall of the cylinder of the converter section, and wherein the nut is securely though releasably secured to the piston rod.

13. An actuator as called for in claim 11 wherein the outer periphery of the nut conforms substantially to the contour of the interior of the cylinder of the converter section including the guide means therein, whereby to constitute an auxiliary piston in the converter section, and conductor means interconnecting corresponding end-adjacent portions of the cylinders of the converter and power sections for simultaneously introducing or exhausting pressure media to and/or from corresponding sides of the piston and auxiliary piston.

14. A rotary torque actuator comprising: a pair of unitary, self-contained converter sections in each of which a linear force is transformed into a rotary force, each of said sections including a cylinder having front and rear end walls having an axial bore therethrough; a drive shaft extending through the bore of the front end wall with forward and rearward portions of the shaft projecting from opposite sides of said end wall; means rotatably mounting said shaft to the front end wall against endwise axial movement therewith, with the rearward portion of the shaft projecting toward and extending through the bore of the rear end wall; a pair of diametrically disposed spiral grooves extending along the length of said rearward portion of the shaft; a nut having a drive-shaft-receptive bore and a pair of diametrically disposed, radially projecting teeth engaging the spiral grooves of the drive shaft; elongate guide means within the cylinder extending between the front and rear end walls thereof; complementary means on the nut in engagement with the elongate guide means for restricting movement of the nut within the cylinder to straight-line, linear travel;

and means imparting linear motion to the nuts of each of said converter sections, said last mentioned means including a unitary, self-contained power section which includes a cylinder having end walls each of which have an axial bore therethrough, a piston reciprocable within the cylinder between fully retracted and advanced positions, a pair of piston rods each having a forward end which includes an elongate, axial, open ended drive-shaft-receptive bore, wherein the length of each piston-rod is such that its forward end projects through a bore in the end walls of the cylinder of the power section and through the bore of the rear wall of the cylinders of the converter sections when said end walls are disposed in abutting relationship and with the piston in a fully retracted position adjacent an end wall of the cylinder of the power section; means securing the nut of each converter section to the forward end of a piston rod with the rearward portion of each drive shaft extending through the bore of its associated nut and terminating within the bore of the piston rod to which the nut is secured; and means securely though releasably interconnecting the converter and power sections in end-to-end tandem relationship, with the power section between the converter sections whereby linear motion imparted to the nuts via the piston rod of the power section is translated into simultaneous rotary motion of the drive shafts incident to movement of the nuts along the rearward spiral grooved portion of the shafts.

15. An actuator as called for in claim 14, wherein the relationship between the spiral grooves of the drive shafts and the teeth of the nuts of each of said converter sections are such that each of the shafts are rotated in the same direction and by the same amount incident to movement of the piston of the power section.

16. An actuator as called for in claim 14, wherein the relationship between the spiral grooves of the drive shafts and the teeth of the nuts of each of said converter sections are such that each of the shafts are rotated in the same direction but through a different number of degrees of rotation incident to movement of the piston of the power section.

17. An actuator as called for in claim 14, wherein the relationship between the spiral grooves of the drive shafts and the teeth of the nuts of each of said converter sections are such that each of the shafts are rotated in opposite directions and through the same number of degrees of rotation incident to movement of the piston of the power section.

18. An actuator as called for in claim 14, wherein the relationship between the spiral grooves of the drive shafts and the teeth of the nuts of each of said converter sections are such that each of the shafts are rotated in opposite directions but through a different number of degrees of rotation incident to movement of the piston of the power section.

19. An actuator as called for in claim 14, wherein the outer periphery of the nuts of each of the converter sections conforms substantially to the transverse sectional internal contour of their respective cylinders whereby each of said nuts constitute an auxiliary piston, and conduits for pressure media interconnecting corresponding end-adjacent portions of the cylinders of the power section and each of said converter sections for simultaneously introducing and/or exhausting pressure media to and/or from corresponding sides of the piston and auxiliary pistons.

20. A rotary torque actuator comprising:

(a) a unitary, self-contained power section in which fluid media, under pressure, imparts linear motion to the piston, piston-rod assembly of a first cylinder, (b) a unitary, self-contained converter section in which the linear motion of the piston-rod of the first cylinder is imparted to a nut housed within a second cylinder in which a drive shaft is rotatably mounted, said nut including a drive-shaft-receptive axial bore having one or more tooth-defining members which project inwardly thereof, and said drive shaft having one or more elongate spiral grooves therein which are the complement of and engaged by the said tooth-defining members of the nut, (c) means engaging and interconnecting said nut and drive shaft whereby linear movement of the nut imparts rotary motion to the drive shaft, and, (d) means interconnecting said power and converter sections in end-to-end, tandem relationship.

21. A rotary torque actuator comprising:

(a) a unitary, self-contained power section in which fluid media, under pressure, imparts linear motion to the piston, piston-rod assembly of a first cylinder, said first cylinder being provided with fluid ports for the introduction and exhaust of fluid media under pressure, (b) a unitary, self-contained converter section in which the liner motion of the piston-rod of the first cylinder is imparted to a nut housed within a second cylinder in which a drive shaft is rotatably mounted, wherein the interior of the second cylinder is normally flooded with lubricant, (c) means engaging and interconnecting said nut and drive shaft whereby linear movement of the nut imparts rotary motion to the drive shaft, and, (d) means interconnecting said power and converter sections in end-to-end, tandem relationship.

22. A rotary torque actuator, comprising:

(a) a unitary, self-contained power section in which fluid media, under pressure, imparts linear motion to the piston, piston-rod assembly of a first cylinder, (b) a unitary, self-contained converter section in which the linear motion of the piston-rod of the first cylinder is imparted to a nut housed within a second cylinder in which a drive shaft is rotatably mounted, the nut constituting an auxiliary piston, and wherein means are provided for simultaneously introducing or exhausting fluid media under pressure to and/or from corresponding sides of the piston and auxiliary piston, (c) means engaging and interconnecting said nut and drive shaft whereby linear movement of the nut imparts rotary motion to the drive shaft, and, (d) means interconnecting said power and converter sections in end-to-end, tandem relationship.

23. A rotary torque actuator comprising: a unitary, self-contained converter section in which a linear force is transformed into a rotary force, said section including a cylinder having front and rear end walls having an axial bore therethrough; a drive shaft extending through the bore of the front end wall with forward and rearward portions of the shaft projecting from opposite sides of said end wall; means rotatably mounting said shaft to the front end wall against endwise axial movement therewith, with the rearward portion of the shaft projecting toward and extending through the bore of the rear end wall; a pair of diametrically disposed spiral grooves extending along the length of said rearward portion of the shaft; a nut having a drive-shaft receptive bore and a pair of diametrically disposed, radially projecting teeth engaging the spiral grooves of the drive shaft; elongate guide means within the cylinder extending between said front and rear end walls; complementary means on the nut in engagement with the elongate guide means for restricting movement of the nut within the cylinder to straight-line, linear travel; and means imparting linear motion to said nut, said last mentioned means including a unitary, self-contained power section which includes a cylinder having front and rear end walls the front one of which has an axial bore therethrough, a piston reciprocable within the cylinder between fully retracted and advanced positions, a piston rod having a forward end which includes an elongate, axial, open-ended drive-shaft-receptive bore, wherein the length of the piston-rod is such that its forward end projects through the bore of the front end wall of the cylinder of the power section and through the bore of the rear wall of the cylinder of the converter section when said end walls are disposed in abutting relationship and with the piston in a fully retracted position adjacent the rear end wall of the cylinder of the power section; means securing the nut to the forward end of the piston rod with the rearward portion of the drive shaft extending through the bore of the nut and terminating within the bore of the piston rod; and means securely though releasably interconnecting the converter and power sections in end-to-end tandem relationship, whereby linear motion imparted to the nut via the piston rod of the power section is translated into rotary motion of the drive shaft incident to movement of the nut along the rearward spiral grooved portion of the shaft; and a reversible, manually-operable fluid pump for selectively applying fluid media under pressure to one or the other sides of the piston, for moving it between fully advanced and fully retracted positions.

* * * * *